United States Patent
Glover

(10) Patent No.: US 10,558,886 B2
(45) Date of Patent: Feb. 11, 2020

(54) TEMPLATE FUSION SYSTEM AND METHOD

(71) Applicant: International Business Machines Corporation, Armonk, NY (US)

(72) Inventor: Raymond Glover, Saffron Walden (GB)

(73) Assignee: International Business Machines Corporation, Armonk, NY (US)

(*) Notice: Subject to any disclaimer, the term of this patent is extended or adjusted under 35 U.S.C. 154(b) by 91 days.

(21) Appl. No.: 15/813,274

(22) Filed: Nov. 15, 2017

(65) Prior Publication Data

US 2019/0147287 A1    May 16, 2019

(51) Int. Cl.
*G06K 9/46* (2006.01)
*G06T 7/20* (2017.01)
*G06T 7/194* (2017.01)

(52) U.S. Cl.
CPC .............. *G06K 9/468* (2013.01); *G06T 7/194* (2017.01); *G06T 7/20* (2013.01); *G06T 2207/10016* (2013.01)

(58) Field of Classification Search
CPC combination set(s) only.
See application file for complete search history.

(56) References Cited

U.S. PATENT DOCUMENTS

| | | | |
|---|---|---|---|
| 9,183,459 B1 * | 11/2015 | Zhang | G06K 9/52 |
| 9,483,701 B1 | 11/2016 | Kwatra et al. | |
| 9,846,808 B2 * | 12/2017 | Duong | G06K 9/4628 |
| 2002/0028003 A1 * | 3/2002 | Krebs | G06K 9/00348 382/115 |
| 2005/0185826 A1 * | 8/2005 | Georgescu | G06K 9/3216 382/103 |
| 2006/0008151 A1 * | 1/2006 | Lin | G06K 9/48 382/190 |
| 2012/0148103 A1 | 6/2012 | Hampel et al. | |
| 2014/0079297 A1 * | 3/2014 | Tadayon | G06K 9/00 382/118 |
| 2014/0369561 A1 * | 12/2014 | Gupta | G06K 9/00362 382/103 |
| 2017/0061229 A1 * | 3/2017 | Rastgar | G06K 9/46 |
| 2017/0193296 A1 * | 7/2017 | Duong | G06K 9/4671 |
| 2018/0165508 A1 * | 6/2018 | Othman | G06K 9/00093 |

FOREIGN PATENT DOCUMENTS

WO    2012141663 A1    10/2012

OTHER PUBLICATIONS

Abou-Moustafa et al., "A Note on Metric Properties for Some Divergence Measures: The Gaussian Case," JMLR: Workshop and Conference Proceedings 25:1-15, 2012, Asian Conference on Machine Learning, pp. 1-15.

(Continued)

*Primary Examiner* — Tsung Yin Tsai
(74) *Attorney, Agent, or Firm* — Reza Sarbakhsh

(57) ABSTRACT

A method, computer program product, and computing system for receiving a plurality of images of a subject. The plurality of images of the subject may be processes to generate one or more templates. A fused template may be generated from the one or more templates based upon, at least in part, a stopping criterion.

17 Claims, 8 Drawing Sheets

(56) References Cited

OTHER PUBLICATIONS

Aherne et al., "The Bhattacharyya Metric As an Absolute Similarity Measure for Frequency Coded Data," Kybernetika, vol. 34 (1998), Presistent URL: http://dml.cz/dmlcz/135216, No. 4, pp. 363-368.
Wikipedia, "Softmax Function," https://en.wikipedia.org/wiki/Softmax_function, downloaded on Aug. 23, 2017, pp. 1-4.
Wikipedia, "Receiver Operating Characteristic," https://en.wikipedia.org/wiki/Receiver_operating_characteristic, downloaded on Aug. 22, 2017, pp. 1-7.
Williams, "Compariative Study of the Gaussian Form of the Bhattacharyya Metric for ATR Performance Evaluation," Proceedings vol. 3070, Algorithms for Synthetic Aperature Radar Imagery IV, (conference-proceedings-of-spie/3070.toc) (1997); doi:10.1117/12.28163, https://www.spiedigitallibrary.org/conference-proceedings-of-spie/3070/1/ Comparative-study; pp. 1-2.

\* cited by examiner

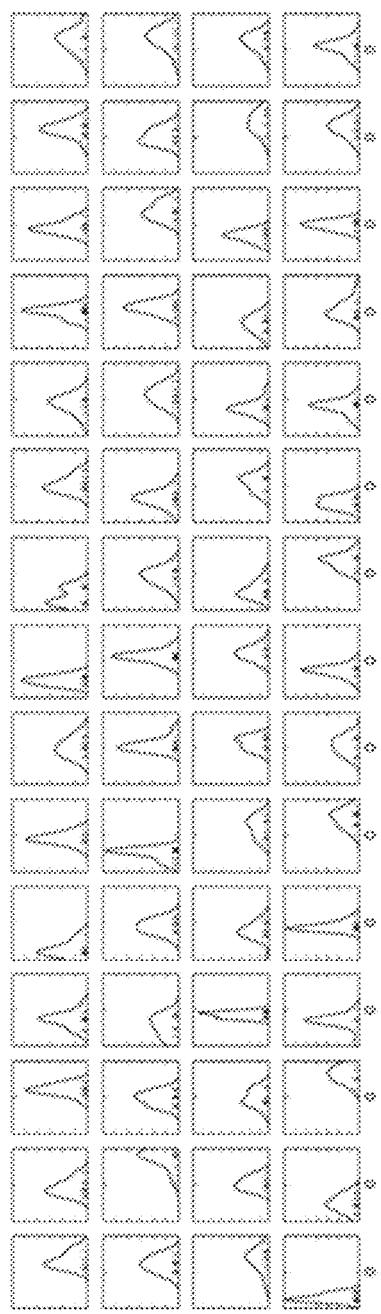
FIG. 4

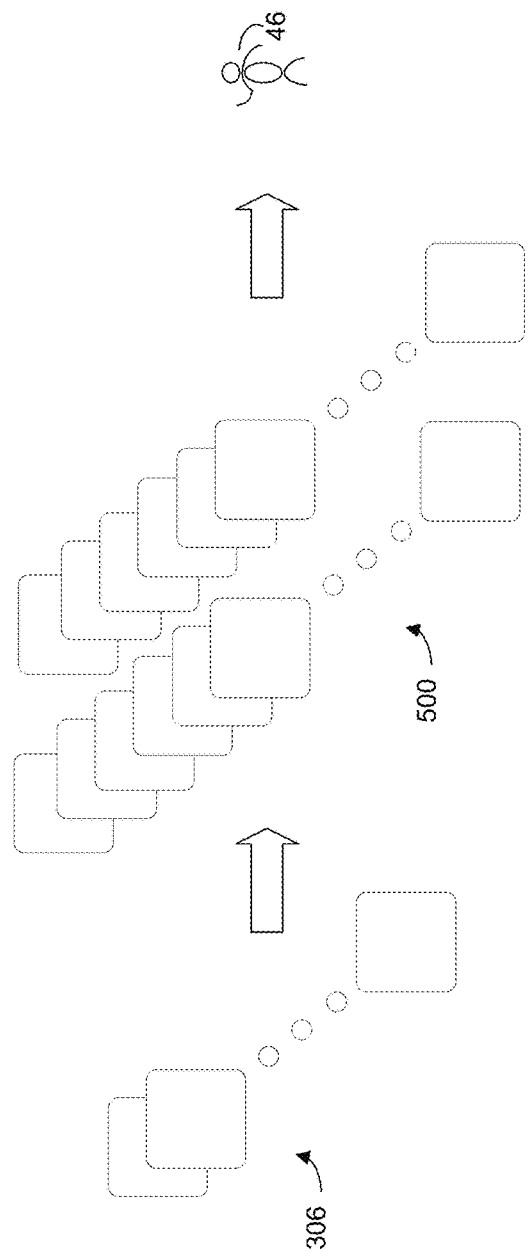

TEMPLATE FUSION SYSTEM AND METHOD

BACKGROUND

Images, such as biometrics, may be recorded and/or used to identify or verify subjects. However, poor image quality may prevent visual identification systems from identifying subjects. For example, poor image quality may occur because of poor lighting, poor resolution, poor sharpness, high noise level, poor range of angles, and/or poor orientation of the subject in the image. As such, visual identification systems and/or visual verification systems may not be sufficiently robust to identify subjects in various challenging environments.

BRIEF SUMMARY OF DISCLOSURE

In one example implementation, a computer-implemented method is executed on a computing device and may include but is not limited to receiving, at the computing device, a plurality of images of a subject. The plurality of images of the subject may be processed to generate a plurality of templates. A fused template may be generated from the one or more templates based upon, at least in part, a stopping criterion.

One or more of the following example features may be included. Generating the fused template may include generating a probability density function based upon, at least in part, a subset of the one or more templates. Generating the probability density function may include initializing the subset of the one or more templates with at least one template from the one or more templates, constructing a sample matrix of the subset of the one or more templates, and generating at least one mean vector and at least one variance vector from the sample matrix. Generating the probability density function may include determining an average standard error of the mean for the probability density function and adding at least one additional template to the subset of the one or more templates based upon, at least in part, the stopping criterion and the average standard error of the mean of the probability density function. The computer-implemented method may also include comparing the fused template to at least one database template based upon, at least in part, a Bhattacharyya distance between the fused template and the at least one database template. Comparing the fused template may include comparing the fused template to the at least one database template to identify the subject in the plurality of images of the subject from a plurality of subjects identified in the at least one database template. Comparing the fused template may include comparing the fused template to the at least one database template to verify whether the subject in the plurality of images of the subject is the subject identified in the at least one database template.

In another example implementation, a computer program product resides on a computer readable medium that has a plurality of instructions stored on it. When executed across one or more processors, the plurality of instructions cause at least a portion of the one or more processors to perform operations that may include but are not limited to receiving a plurality of images of a subject. The plurality of images of the subject may be processed to generate a plurality of templates. A fused template may be generated from the one or more templates based upon, at least in part, a stopping criterion.

One or more of the following example features may be included. Generating the fused template may include generating a probability density function based upon, at least in part, a subset of the one or more templates. Generating the probability density function may include initializing the subset of the one or more templates with at least one template from the one or more templates, constructing a sample matrix of the subset of the one or more templates, and generating at least one mean vector and at least one variance vector from the sample matrix. Generating the probability density function may include determining an average standard error of the mean for the probability density function and adding at least one additional template to the subset of the one or more templates based upon, at least in part, the stopping criterion and the average standard error of the mean of the probability density function. Operations of at least a portion of the one or more processors may include comparing the fused template to at least one database template based upon, at least in part, a Bhattacharyya distance between the fused template and the at least one database template. Comparing the fused template may include comparing the fused template to the at least one database template to identify the subject in the plurality of images of the subject from a plurality of subjects identified in the at least one database template. Comparing the fused template may include comparing the fused template to the at least one database template to verify whether the subject in the plurality of images of the subject is the subject identified in the at least one database template.

In another example implementation, a computing system comprising one or more processors and one or more memories, wherein the computing system is configured to perform operations that may include but are not limited to receiving a plurality of images of a subject. The plurality of images of the subject may be processed to generate a plurality of templates. A fused template may be generated from the one or more templates based upon, at least in part, a stopping criterion.

One or more of the following example features may be included. Generating the fused template may include generating a probability density function based upon, at least in part, a subset of the one or more templates. Generating the probability density function may include initializing the subset of the one or more templates with at least one template from the one or more templates, constructing a sample matrix of the subset of the one or more templates, and generating at least one mean vector and at least one variance vector from the sample matrix. Generating the probability density function may include determining an average standard error of the mean for the probability density function and adding at least one additional template to the subset of the one or more templates based upon, at least in part, the stopping criterion and the average standard error of the mean of the probability density function. Operations of the computing system may include comparing the fused template to at least one database template based upon, at least in part, a Bhattacharyya distance between the fused template and the at least one database template. Comparing the fused template may include comparing the fused template to the at least one database template to identify the subject in the plurality of images of the subject from a plurality of subjects identified in the at least one database template. Comparing the fused template may include comparing the fused template to the at least one database template to verify whether the subject in the plurality of images of the subject is the subject identified in the at least one database template.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE SEVERAL VIEWS OF THE DRAWINGS

FIG. 4 is an example multivariate probability density function that may be generated according to one or more example implementations of the disclosure;

FIG. 5 is an example diagrammatic view of the comparison of a fused template to at least one database template according to one or more example implementations of the disclosure;

Like reference symbols in the various drawings indicate like elements.

DETAILED DESCRIPTION

Figure 1:
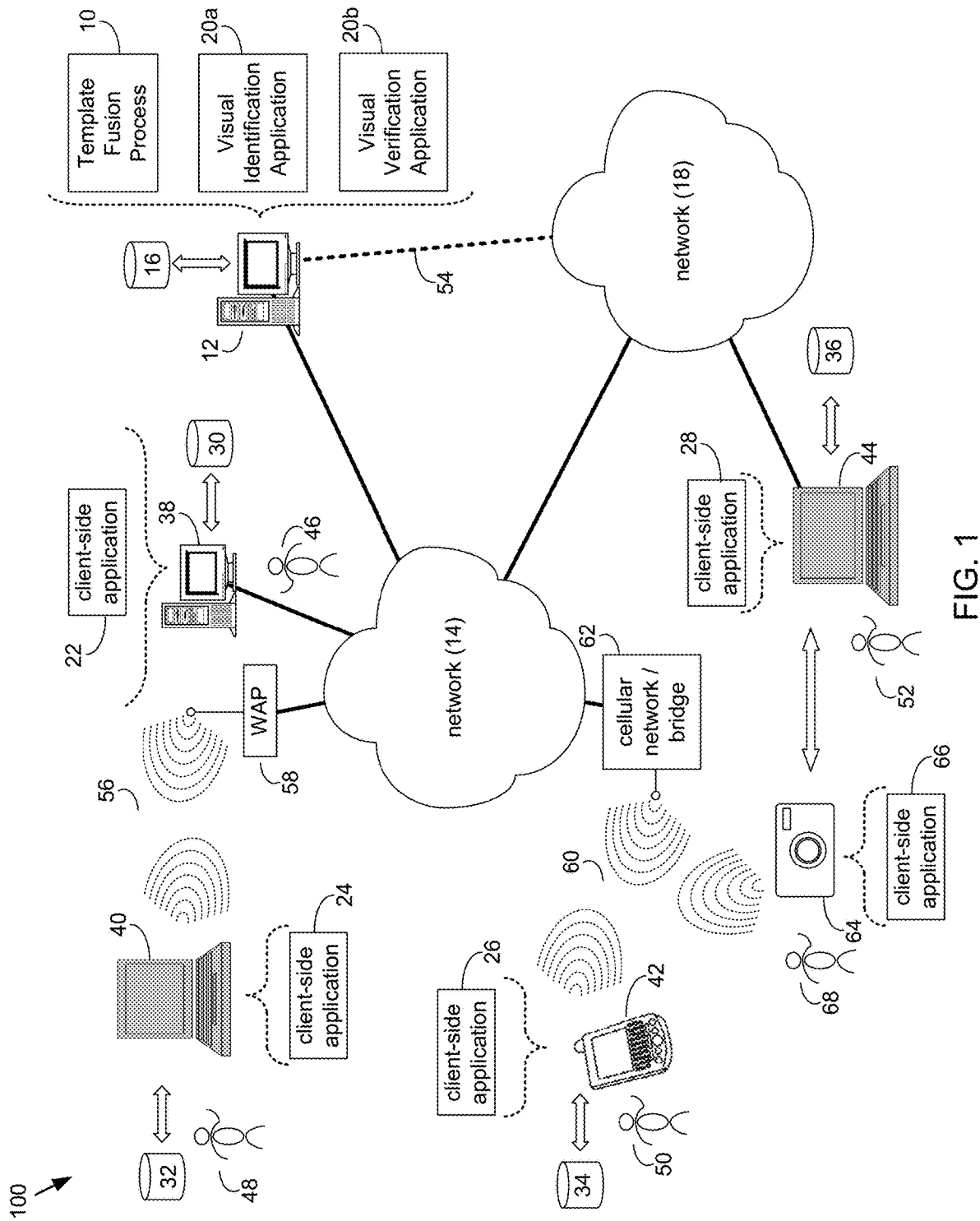
FIG. 1 is an example diagrammatic view of template fusion process coupled to a distributed computing network according to one or more example implementations of the disclosure.
Figure 2:
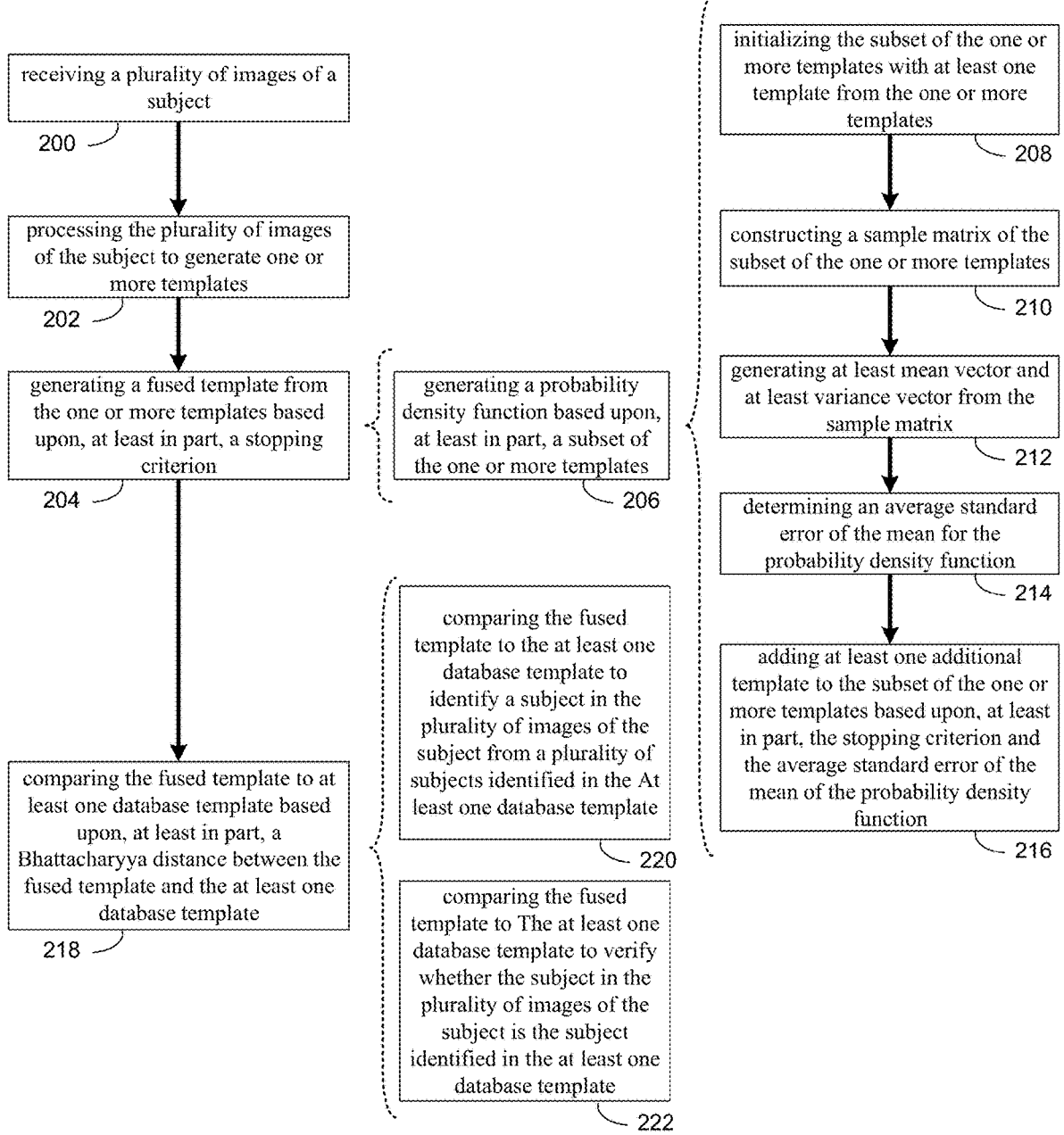
FIG. 2 is an example flowchart of the template fusion process of FIG. 1 according to one or more example implementations of the disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown template fusion process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a template fusion process, such as template fusion process 10 of FIG. 1, may receive a plurality of images of a subject. The plurality of images of the subject may be processed to generate a plurality of templates. A fused template may be generated from the one or more templates based upon, at least in part, a stopping criterion.

The instruction sets and subroutines of template fusion process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Template fusion process 10 may be a stand-alone application that interfaces with an applet/application that is accessed via client applications 22, 24, 26, 28. In some embodiments, template fusion process 10 may be, in whole or in part, distributed in a cloud computing topology. In this way, computing device 12 and storage device 16 may refer to multiple devices, which may also be distributed throughout network 14 and/or network 18.

Computing device 12 may execute a visual identification application (e.g., visual identification application 20a), examples of which may include, but are not limited to, applications that process images to determine the identity of a subject in the image based upon a plurality of database templates. Additionally, Computing device 12 may execute a visual verification application (e.g., visual verification application 20b), examples of which may include, but are not limited to, applications that process images to verify if a subject in an image is a subject defined in at least one database template. Template fusion process 10 and/or visual identification application 20a and/or visual verification application 20b may be accessed via client applications 22, 24, 26, 28, 66. Template fusion process 10 may be a stand-alone application, or may be an applet/application/script/extension that may interact with and/or be executed within visual identification application 20a and/or visual verification application 20b, a component of visual identification application 20a and/or visual verification application 20b, and/or one or more of client applications 22, 24, 26, 28, 66. Visual identification application 20a and/or visual verification application 20b may be a stand-alone application, or may be an applet/application/script/extension that may interact with and/or be executed within template fusion process 10, a component of template fusion process 10, and/or one or more of client applications 22, 24, 26, 28. One or more of client applications 22, 24, 26, 28 may be a stand-alone application, or may be an applet/application/script/extension that may interact with and/or be executed within and/or be a component of template fusion process 10 and/or visual identification application 20a and/or visual verification application 20b. Examples of client applications 22, 24, 26, 28, 66 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 66 which may be stored on storage devices 30, 32, 34, 36, 802 coupled to client electronic devices 38, 40, 42, 44 and camera system 64, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 66 may be configured to effectuate some or all of the functionality of template fusion process 10 (and vice versa). Accordingly, template fusion process 10 may be a purely server-side application, a purely client-side application, or a hybrid server-side/client-side application that is cooperatively executed by one or more of client applications 22, 24, 26, 28, 66 and/or template fusion process 10.

One or more of client applications 22, 24, 26, 28, 66 may be configured to effectuate some or all of the functionality of visual identification application 20a and/or visual verification application 20b (and vice versa). Accordingly, search application 20 may be a purely server-side application, a purely client-side application, or a hybrid server-side/client-side application that is cooperatively executed by one or more of client applications 22, 24, 26, 28 and/or visual identification application 20a and/or visual verification application 20b. As one or more of client applications 22, 24, 26, 28, template fusion process 10, and visual identification application 20a and/or visual verification application 20b, taken singly or in any combination, may effectuate some or all of the same functionality, any description of effectuating such functionality via one or more of client applications 22, 24, 26, 28, template fusion process 10, visual identification application 20a, visual verification application 20b, or combination thereof, and any described interaction(s) between one or more of client applications 22, 24, 26, 28, 66 template fusion process 10, visual identification application 20a, visual verification application 20b, or combination thereof to effectuate such functionality, should be taken as an example only and not to limit the scope of the disclosure.

Users 46, 48, 50, 52, 68 may access computing device 12 and template fusion process 10 (e.g., using one or more of client electronic devices 38, 40, 42, 44 and/or camera system 64) directly or indirectly through network 14 or through secondary network 18. Further, computing device 12 may be connected to network 14 through secondary network 18, as illustrated with phantom link line 54. Template fusion process 10 may include one or more user interfaces, such as browsers and textual or graphical user interfaces, through which users 46, 48, 50, 52 may access template fusion process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. Additionally, camera system 64 is shown wirelessly coupled to network 14 via wireless communication channel 60 established between camera system 64 and cellular network/bridge 62, which is shown directly coupled to network 14. Camera system 64 may be configured to be communicatively coupled to a client electronic device (e.g., client electronic device 44) to transmit and/or receive data to network 14 via client electronic device 44.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, a visual identification system may include one or more of a client electronic device (e.g., client electronic devices 38, 40, 42, 44 (and/or computing device 12)), a camera system (e.g., camera system 64), a network (e.g., network 14), template fusion process 10, and/or a visual identification application (e.g., visual identification application 20a). In some implementations, a visual verification system may include one or more of a client electronic device (e.g., client electronic devices 38, 40, 42, 44 (and/or computing device 12)), a camera system (e.g., camera system 64), a network (e.g., network 14), template fusion process 10, and/or a visual verification application (e.g., visual verification application 20b).

As discussed above and referring also at least to FIGS. 2-8, template fusion process 10 may receive 200 a plurality of images of a subject. The plurality of images of the subject may be processed 202 to generate a plurality of templates. A fused template may be generated 204 from the one or more templates based upon, at least in part, a stopping criterion.

As generally discussed above with reference to FIG. 2, template fusion process 10 may receive 200 a plurality of images of a subject. In some implementations, an image may include a photograph. The image may be a digital representation displayed on a user interface and/or may be a physical photograph or a reproduction of a photograph. In some implementations, template fusion process 10 may receive the plurality of images via a camera system (e.g., camera system 64). Camera system 64 may be configured to capture a video of a subject. A subject may generally include an object of known or unknown identity. In some implementations, the plurality of images may include a biometric identifier associated with a subject. In some implementations, the subject may be a biometric identifier. A biometric identifier may generally refer to physiological characteristics that are related to a shape or configuration of a body or portions of the body. Examples of biometric identifiers may generally include fingerprints, retina/iris, facial patterns, etc. In some implementations, the subject may include an object such as, for example, a road sign, a vehicle, a tattoo, and/or any object which may be photographed and/or visually captured in a video or photograph.

In some implementations, template fusion process 10 may receive a plurality of images by extracting the plurality of images from a video. In some implementations, template fusion process 10 may receive a plurality of images that may or may not have been previously extracted from a video. For example, camera system 64 may capture a video of a subject (e.g., user 46). Template fusion process 10 may extract a plurality of images of the subject (e.g., user 46) from the video captured by camera system 64. For example, the plurality of images from the video may include a plurality of individual frames of the video. In some implementations, camera system 64 may capture a plurality of images of the subject (e.g., user 46) and template fusion process 10 may receive the plurality of images from camera system 64. In some implementations, a video of the subject may be received from a computing device (e.g., client electronic devices 38, 40, 42, 44 (and/or computing device 12)) and template fusion process 10 may extract a plurality of images of the subject from the video received from a computing device. Additionally, a plurality of images of the subject (e.g., user 46) may be received from a computing device (e.g., client electronic devices 38, 40, 42, 44 (and/or computing device 12)).

In some implementations, the plurality of images may be received from a biometric scanning device. A biometric scanning device may generally include a scanning device configured to capture biometric identifiers from and associated with an individual or subject. Example biometric scanning devices may include a fingerprint scanner, a retinal scanner, an iris scanner, etc. coupled to and/or included within computing device 12 and/or camera system 64.

In some implementations, the received plurality of images may be referred to as a "track". A track may generally include a sequence of images of a subject. A "k-track" may refer to a track of "k" images, where "k" is the number of images.

In some implementations, the plurality of images extracted from a video or otherwise received by template fusion process 10 may include one or more low quality images. A low quality image may be the result of one or more of low quality or non-ideal lighting, resolution, sharpness, noise level, range of angles or orientation of a subject, etc. As will be discussed in greater detail below, low quality images received by conventional object recognition systems may reduce the efficiency or even the possibility of identifying or verifying a subject in a plurality of images. In an illustrative example situation, the low quality images may reduce the efficiency and/or possibility of identifying or verifying the subject based upon any one of the individual images of the plurality of images.

In some implementations, the plurality of images may be received during an enrollment of a subject. For example, template fusion process 10 may receive a plurality of images of a subject (e.g., user 46). The plurality of images of user 46 may be used to enroll the subject (e.g., user 46) in a database of images that may be used for identifying the subject from one or more known potential subjects or verifying the identity of the subject against one or more known subjects. For example, suppose camera system 64 captures a video of user 46. Further suppose that user 46's identity is known at the time camera system 46 captures the video of user 46. As will be discussed in greater detail below, template fusion process 10 may enroll user 46 into a database of known subjects by generating a fused template associated with user 46.

Figure 3:
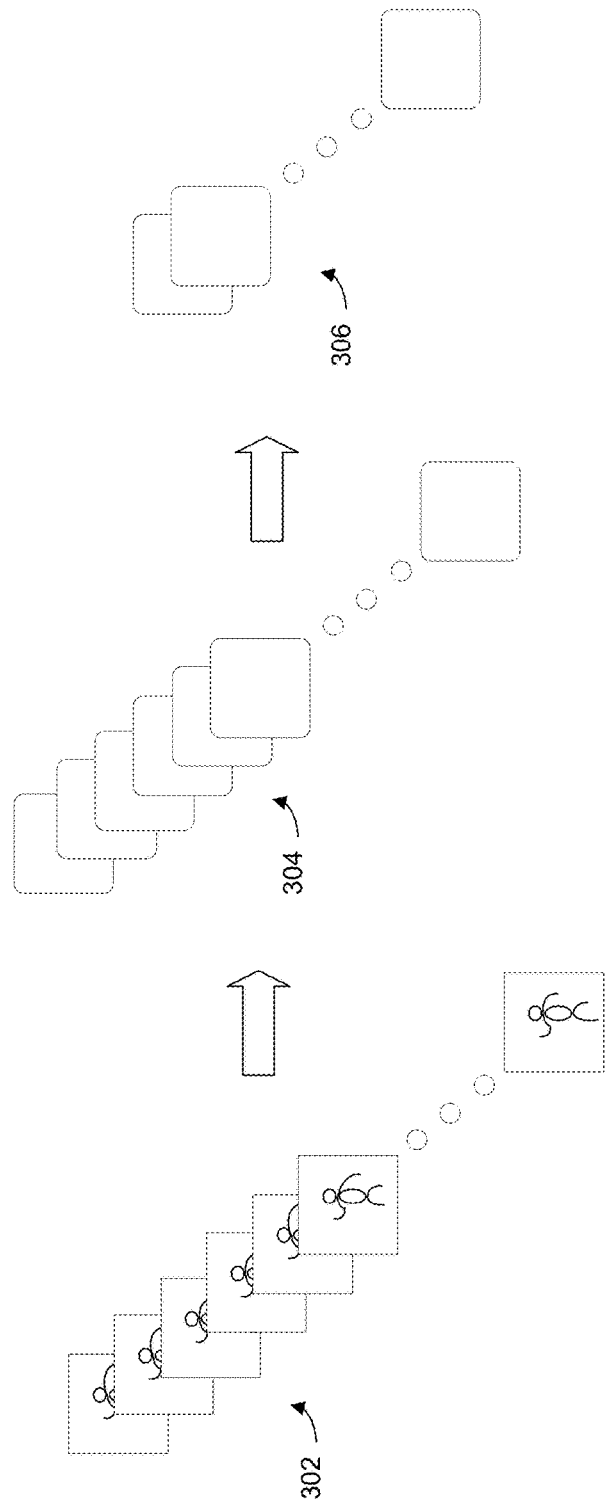
FIG. 3 is an example diagrammatic view of the processing of a plurality of images to generate a plurality of templates and the generation of a fused template according to one or more example implementations of the disclosure.

Referring also to FIG. 3 and in some implementations, template fusion process 10 may process 202 the plurality of images of the subject to generate a plurality of templates. In some implementations, template fusion process 10 may process a plurality of images (e.g., plurality of images 302) to generate a plurality of templates (e.g., plurality of templates 304). A template may generally include a representation of a subject that is generated by an object recognition system. Examples of object recognition systems may include, but are not limited to, neural networks. A neural network, or artificial neural network, may generally include a computing system that "learns" to do tasks by processing examples. In some implementations, a neural network is able to identify an image or a subject within an image by analyzing a plurality of example images or images of a particular subject that are pre-identified. From this "training" with pre-identified images, a neural network is able to generally identify a similar image and/or identify the subject within a different image.

In some implementations, template fusion process 10 may process the plurality of images (e.g., plurality of images 302) to generate the plurality of templates (e.g., plurality of templates 304) by processing the plurality of images using a neural network. A template that is generated by a neural network may also be referred to as an embedding. An embedding may be generated for each image of the plurality of images. An embedding may generally include a numerical representation of the image that has been processed by the neural network. In some implementations, the numerical representation of the image may include one or more vectors of elements or values that represent the image. In some implementations, an embedding may include a single "n"-dimensional vector, where "n" is a number of elements. In some implementations, a neural network may generate may generate multiple outputs and designate one of the output vectors to be an embedding vector. In some implementations, multiple vectors may be concatenated to produce a larger embedding. In this way, and as will be discussed in greater detail below, the plurality of templates (e.g., plurality of templates 304) may be compared against one another to generate a fused template (e.g., fused template 306). In some implementations where the plurality of images include biometric identifiers, the plurality of templates generated by template fusion process 10 may generally be referred to as "biometric templates".

In some implementations, template fusion process 10 may generate 204 a fused template (e.g., fused template 306) from the one or more templates based upon, at least in part, a stopping criterion. A fused template may generally refer to a template generated from a subset of one or more templates of the plurality of templates that combines the features/information from the subset of one or more templates to provide a representative fused template that is more likely to classify the subject than each of the plurality of templates taken separately. As will be discussed in greater detail below, template fusion process 10 may reduce the number of images and/or templates compared to a database to identify or verify a subject by generating a fused template that is representative of the plurality of images. The fused template may be compared to at least one database template instead of comparing each of the plurality of templates to the at least one database template.

In some implementations, the fused template may include a higher quality and/or more robust representation of the subject when compared to at least one database template than a plurality of low quality templates when compared to at least one database template individually. For example, suppose template fusion process 10 receives fourteen images of user 46. One or more of these images may be low quality (e.g., blurred, taken from a distance, poor lighting, etc.) and/or may include an image of the back of user 46's head and/or images of the left and right sides of user 46's face. Additionally, an image of the front of user 46's face may be blurry. As such, these images individually may provide relatively poor comparisons to at least one database template (e.g., of faces). As will be discussed in greater detail below, template fusion process 10 may generate a fused template of the subject in the fourteen images (e.g., via a plurality of templates) that may include a fusion of a subset of the plurality of templates that may provide a higher quality and/or more robust representation of the subject (e.g., in terms of classifying the subject) than the plurality of templates taken separately or individually.

A stopping criterion may generally refer to a value for determining when the addition of more templates into the fused template is unlikely to improve the performance of the fused template in terms of properly classifying the subject. For example, comparing each of the plurality of templates to at least one database template may result in many wasted comparisons as some templates may be poor quality templates. A comparison of a fused template including every template of the plurality of templates may or may not be more efficient than the comparison of each of the plurality of templates to at least one database template. As such, the stopping criterion may determine when the addition of more templates into the fused template is unlikely to improve the performance of the fused template in terms of properly classifying the subject. As will be discussed in greater detail below, the stopping criterion may relate to an acceptable error tolerance or threshold between one or more templates of the plurality of templates. For example and as will be discussed in greater detail below, a subset of templates of the plurality of templates may be compared and the difference (e.g., variance) between the subset of templates may be determined. In some implementations, the stopping criterion may define an acceptable amount of variance between the subset of templates in the fused template.

In some implementations, the stopping criterion may be received from a user via a graphical user interface. The stopping criterion may be a default value (e.g., $\varepsilon=0.025$, where "$\varepsilon$" is the stopping criterion) or may be specific to template fusion process 10 and/or a visual identification system and/or visual verification system. In some implementations, the stopping criterion may be based upon, at least in part, the performance of a visual identification system and/or a visual verification system. In some implementations, the stopping criterion may be empirically determined based upon, at least in part, the performance of the visual identification system and/or the visual verification system. For example, a high performance visual identification system and/or visual verification system may be determined to have a higher error tolerance (e.g., a higher stopping criterion) while a low performance visual identification system and/or visual verification system may be determined to have a lower error tolerance (e.g., a lower stopping criterion).

As will be discussed in greater detail below, in some implementations the fused template generated 204 by template fusion process 10 may include a subset of the plurality of templates that may demonstrate significantly better identification performance than would otherwise be possible using an exhaustive search of a database using each template of the plurality of templates separately.

In some implementations, generating 204 the fused template may include normalizing the values of the plurality of embeddings/templates by a "min-max normalization" of one or more (e.g., each) template of the plurality of templates, as shown below in Equation 1.

$$T'_{i_j} = \frac{T_{i_j} - \min(T_i)}{\max(T_i) - \min(T_i)} \quad (1)$$

where $T_{i_j}$ is the "j-th" element of the "i-th" template of the plurality of templates and $T'_{i_j}$ is the normalized "j-th" element of the "i-th" template of the plurality of templates.

Referring also to FIG. 4 and in some implementations, template fusion process 10 may generate 206 a probability density function based upon, at least in part, a subset of one or more templates. In some implementations, each template of the subset of one or more templates may be a "sample" in a probability density function representative of the plurality of templates. For example, assume that template fusion process 10 receives a "14-track" or a track of fourteen images. Template fusion process 10 may process the 14-track to generate a plurality of templates. In some implementations, template fusion process 10 may generate fourteen templates representative of the fourteen images. Each template or embedding may include "n" elements or values. In some implementations, template fusion process 10 may generate fourteen templates with sixty elements each. FIG. 4 shows an example multivariate distribution 400 for the example 14-track. In some implementations, each sub-plot of FIG. 4 may include a probability density and/or a probability distribution function for each dimension of the sixty element embeddings (e.g., one sub-plot per element of the plurality of templates/embeddings). Each sample in the sub-plot for a given element may represent the same element from each template. In some implementations and as will be discussed in greater detail below, the probability density function may be a Gaussian or normal distribution. In other words, the distribution for each element of the subset of templates may be assumed to be Gaussian or normal. However, other distributions are within the scope of the present disclosure.

In some implementations, generating 206 the probability density function may include generating a multivariate probability density function. For example, each element of the embedding may represent a single dimension. In the 14-track example of FIG. 4, where each template includes sixty elements, each element may represent a single dimension. In this example, template fusion process 10 may generate a multivariate probability density function to represent one or more of the sixty dimensions of the plurality of templates. As will be discussed in greater detail below, the fused template (e.g., fused template 306) may include the probability density function generated by template fusion process 10.

In some implementations, generating 206 the probability density function may include initializing 208 the subset of the one or more templates with at least one template from the one or more templates. In some implementations, template fusion process 10 may generate a subset or "sub-track" of templates that may be used to generate the probability density function. Template fusion process 10 may initialize 208 the subset of the one or more templates by selecting at least one template to add to the subset of the one or more templates. Initializing the subset of the one or more templates with at least one template may generally include providing or selecting at least one template as a basis for generating the fused template. In some implementations, template fusion process 10 may initialize 208 the subset with at least two templates. The at least two templates may be selected sequentially from the plurality of templates and/or randomly from the plurality of templates. However, other selection methodologies are within the scope of the present disclosure. In some implementations, template fusion process may define the length of the sub-track or subset of the one or more templates as "n" templates, where "n" is the number of templates in the subset of the one or more templates. In some implementations, the subset of the one or more templates may include the normalized templates as discussed above in relation to Equation 1.

In some implementations, generating 206 the probability density function may include constructing 210 a sample matrix of the subset of the one or more templates. Template fusion process 10 may construct or generate 210 a matrix of the first "n" templates in the subset of the one or more templates. An example matrix is shown below in Equation 2.

$$S = \begin{pmatrix} T'_{1_1} & \cdots & T'_{n_1} \\ \vdots & \ddots & \vdots \\ T'_{1_m} & \cdots & T'_{n_m} \end{pmatrix} \quad (2)$$

where S is the sample matrix including the first "n" templates as columns and the first "m" elements of each template as rows. The value of "n" may be the number of templates in the subset of the one or more templates.

In some implementations, generating 206 the probability density function may include generating 212 at least one mean vector and at least one variance vector from the sample matrix. As shown above in Equation 2, template fusion process 10 may generate 212 at least one mean vector from the sample matrix by reducing the sample matrix to at least one mean vector. In some implementations, template fusion process 10 may generate 212 a single mean vector from the sample matrix. For example, template fusion process 10 may determine the mean(s) associated with each element or row in the sample matrix (e.g., the mean of $T'_{1_1} \ldots T'_{n_1}$ as shown in Equation 2). Template fusion process 10 may generate 212 at least one variance vector from the sample matrix by reducing the sample matrix to at least one variance vector. Template fusion process 10 may determine the variance between the elements for each template (e.g., the variance between $T'_{1_1} \ldots T'_{n_1}$ as shown in Equation 2). In some implementations, template fusion process 10 may generate 212 a single variance vector from the sample matrix, where each element in the variance vector may represent the variance between the elements of the subset of templates. For example, a greater variance between the elements of the subset of templates may indicate low similarity between the subset of templates. A smaller variance between the subset of templates may indicate high similarity between the subset of templates. As will be discussed in greater detail below and in some implementations, the probability density function may be generated 206, based upon, at least in part, the at least one mean vector and the at least one variance vector.

In some implementations, generating 206 the probability density function may include determining 214 an average standard error of the mean for the probability density function. As discussed above, template fusion process 10 may generate 206 a probability density function for the subset of the one or more templates based upon, at least in part, the at least one mean vector and the at least one variance vector. An average standard error of the mean may generally be defined as shown below in Equation 3.

$$\sigma'_M = \frac{1}{n} \sum_{i=1}^{n} \frac{\sigma_i}{\sqrt{n}} \quad (3)$$

where $\sigma'_M$ may be the average standard error of the mean, "n" may be the number of templates in the subset of one or more templates, and "$\sigma_i$" may be the "i-th" standard deviation (e.g., as determined from the at least one variance vector).

In some implementations, generating 206 the probability density function may include adding 216 at least one additional template to the subset of the one or more templates based upon, at least in part, the stopping criterion and the average standard error of the mean of the probability density function. As discussed above, the stopping criterion may generally define when the addition of more templates into the fused template (e.g., fused template 306) will not reduce the likelihood of misclassification of the subject and/or improve the performance of the fused template in terms of properly classifying the subject. In this way, template fusion process 10 may reduce the amount of resources (e.g., time, computing power, etc.) spent generating the fused template (e.g., fused template 306).

In some implementations, template fusion process 10 may compare the average standard error of the mean generated for the probability density function with the stopping criterion. In some implementations, if the average standard error of the mean is less than the stopping criterion, template fusion process 10 may generate or yield the fused template (e.g., fused template 306). As discussed above, the fused template (e.g., fused template 306) may include a probability density function generated based upon, at least in part, the subset of the one or more template. In some implementations, the fused template (e.g., fused template 306) may include a Gaussian or normal distribution based upon, at least in part, the at least one mean vector and the at least one variance vector. In some implementations, the fused template (e.g., fused template 306) may be represented as a combination of the at least one mean vector and the at least one variance vector as shown below in Equation 4.

$$p = (\overline{\mu}, \overline{\sigma^2}) \quad (4)$$

where "p" may be the fused template, "$\overline{\mu}$" may be the at least one mean vector, and "$\overline{\sigma^2}$" may be the at least one variance vector.

In some implementations, if the average standard error of the mean is greater than or equal to the stopping criterion, template fusion process may add 216 at least one additional template to the subset of the one or more templates. As discussed above, the at least one additional template may be randomly selected from the plurality of templates and/or may be selected sequentially based upon, at least in part, the last template added to the subset of the one or more templates. The addition of at least one additional template may reduce the error or variance between the subset of the one or more templates. In some implementations, this may enhance the likelihood of classifying the subject in the plurality of images based upon the fused template. For example, template fusion process 10 may generate an improved fused template (e.g., fused template 306) to represent the subject from the plurality of images when the average standard error of the mean associated with the probability density function is lowered. By adding at least one additional template to the subset of the one or more templates, template fusion process 10 may generate a more accurate and robust fused template (e.g., fused template 306). In some implementations, template fusion process 10 may add 216 a single additional template to the subset of the one or more templates when the average standard error of the mean is greater than or equal to the stopping criterion (e.g., n templates in the subset of the one or more templates=n templates in the subset of the one or more templates+one additional template).

With the at least one additional template, template fusion process 10 may construct 210 an updated sample matrix of the subset of the one or more templates including the at least one additional template. As discussed above, template fusion process 10 may generate 212 at least one updated mean vector and at least updated one variance vector from the updated sample matrix including the at least one additional template. In response to generating the at least one updated mean vector and the at least updated one variance vector from the updated sample matrix, template fusion process 10 may determine 214 an updated average standard error of the mean for the probability density function associated with the subset of the one or more templates including the at least one additional template.

In some implementations, template fusion process 10 may compare the updated average standard error of the mean generated for the probability density function generated from the subset of the one or more templates with the stopping criterion. As discussed above, if the average standard error of the mean is less than the stopping criterion, template fusion process 10 may generate or yield the fused template (e.g., fused template 306). If the average standard error of the mean is greater than or equal to the stopping criterion, template fusion process may add 216 at least one additional template to the subset of the one or more templates and iteratively repeat the above-described process (e.g., constructing 210 the sample matrix, generating 212 at least one mean vector and at least one variance vector, and/or determining 214 an average standard error of the mean) until one or more of the updated average standard error of the mean is less than the stopping criterion or the subset of one or more templates includes all of the templates of the plurality of templates.

Referring also to FIG. 5 and in some implementations, template fusion process 10 may compare 218 the fused template to at least one database template based upon, at least in part, a Bhattacharyya distance between the fused template and the at least one database template. In some implementations, a fused template (e.g., fused template 306) that is used to search a database may generally be referred to as a "probe". As discussed above, template fusion process 10 may generate a fused template (e.g., fused template 306) representative of the plurality of images. In some implementations, template fusion process 10 may compare the fused template (e.g., fused template 306) to at least one database template (e.g., database template 500). A database template may generally refer to a pre-defined template of a subject. In some implementations, the at least one database template (e.g., database template 500) may be accessible to computing device 12 during execution of a visual identification application and/or a visual verification application within a visual identification system and/or a visual verification system. In some implementations, the at least one database template (e.g., database template 500) may be stored in storage device accessible to computing device 12 (e.g., storage device 16). In some implementations, the at least one database template (e.g., database template 500) may be stored in a "cloud-based" storage system accessible to computing device 12. In some implementations, the at least one database template (e.g., database template 500) may include at least one fused template.

In some implementations, the Bhattacharyya distance may generally refer to the distance or similarity between multivariate normal distributions and may be represented in equation format as shown below in Equation 5.

$$D_B(p, a) = \frac{1}{8}(\mu_p - \mu_a)^T \Sigma^{-1} (\mu_p - \mu_a) + \frac{1}{2} \ln\left(\frac{det\Sigma}{\sqrt{det\Sigma_p det\Sigma_a}}\right) \quad (5)$$

where $D_B$ (p, a) may be the continuous multivariate Bhattacharyya distance between two distributions (e.g., templates), "p" and "a", "$\mu_i$" may be the mean vector for the distribution "i" (e.g., template "i"), "$\Sigma_i$" may be the covariance for the distribution "i" (e.g., template "i"), and $$\Sigma = \frac{\Sigma_a + \Sigma_p}{2}.$$

In some implementations, by taking advantage of the geometric derivation of the Bhattacharyya distance, template fusion process 10 may be applied to pre-existing models that use geometric similarity measures including, for example, neural networks trained with standard softmax-based classification regimes.

In some implementations, the fused template and the at least one database template may be compared for similarity in terms of a likelihood of misclassification based upon, at least in part, the Bhattacharyya distance. In some implementations and as discussed above, the fused template and/or the database template may include a probability density function. The probability density function of the fused template and/or database template may each include mean and variance vectors. In some implementations, the Bhattacharyya distance between the fused template (e.g., fused template 306) and the at least one database template (e.g., database template 500) may be used to account for differences in standard deviations between the fused template and the at least one database template. In some implementations, the fused template (e.g., fused template 306) may include a multivariate probability density function with a first standard deviation and the at least one database template (e.g., database template 500) may include at least a second standard deviation. In some implementations, the first standard deviation and the at least a second standard deviation may be different. For example, the at least one database template (e.g., database template 500) may include at least one high quality template processed from at least one high quality image. As such, the standard deviation associated with the at least one database template (e.g., database template 500) may be different than the standard deviation associated with a fused template (e.g., fused template 306).

In some implementations and as discussed above, the plurality of images received by template fusion process 10 may include low quality images. Additionally, the standard deviation of the fused template (e.g., fused template 306) may be different than that of the at least one database template (e.g., database template 500) due to e.g., low quality or non-ideal lighting, resolution, sharpness, noise level, range of angles or orientation of a subject, high blur, random noise, etc. By utilizing the Bhattacharyya distance to compare the fused template (e.g., fused template 306) to the at least one database template (e.g., database template 500), lower quality images received by template fusion process 10 may be used to identify and/or verify the subject despite any differences in standard deviations.

In some implementations, comparing 218 the fused template to the at least one database template may include generating a match vector based upon, at least in part, the Bhattacharyya distance between the fused template and the at least one database template. An example of the match vector is shown below in Equation 6.

$$M=\{D_B(p,a)|a\in A\} \quad (6)$$

where $D_B$ (p, a) may be the continuous multivariate Bhattacharyya distance between two distributions "p" and "a" (e.g., templates "p" and "a"), and "a" may be a template of a database of "n" fused templates: $A=\{A_1 A_2, \ldots A_n\}$.

In some implementations, template fusion process 10 may generate values for each element in the match vector based upon, at least in part, the Bhattacharyya distance between each fused template e.g., "p" and database template e.g., "a" pair. In response to generating values for each element in the match vector, template fusion process 10 may sort the match vector in ascending order to produce the closest match(es) to the fused template (e.g., fused template 306).

In some implementations, comparing 218 the fused template to the at least one database template may include comparing 220 the fused template to the at least one database template to identify a subject in the plurality of images of the subject from a plurality of subjects identified in the at least one database template. In some implementations, the at least one database template may include a plurality of database templates associated with a plurality of subjects. The plurality of database templates may be associated with known subjects, such that a visual identification system may identify a subject by comparing the received plurality of images (e.g., via the fused template) to the plurality of database templates. In some implementations, template fusion process 10 may generate a fused template (e.g., fused template 306) of user 46 based upon, at least in part, receiving a plurality of images of user 46. Template fusion process 10 may compare the fused template (e.g., fused template 306) to the plurality of database templates to determine whether or not the identity of the subject (e.g., user 46) can be determined from the plurality of images using the plurality of database templates. While the above example describes identifying the subject from the plurality of images as a known subject (e.g., user 46), template fusion process 10 may compare the fused template to the at least one database template to identify any subject (e.g., any object such as a road sign, a vehicle, a tattoo, or any other object) in the plurality of images of the subject is the subject (e.g., an object such as a road sign, a vehicle, a tattoo, etc.) identified in the at least one database template.

In some implementations, comparing 218 the fused template to the at least one database template may include comparing 222 the fused template to the at least one database template to verify whether the subject in the plurality of images of the subject is the subject identified in the at least one database template. In some implementations, the at least one database template may include a plurality of database templates associated with a plurality of subjects. In some implementations, the at least one database template may include a database template associated with a particular subject. In some implementations, a visual verification system may verify a subject by comparing the fused template to the at least one database template to verify that the subject in the plurality of images is the subject of the at least one database template. In some implementations, template fusion process 10 may generate a fused template (e.g., fused template 306) of user 46 based upon, at least in part, receiving a plurality of images of user 46. Template fusion process 10 may compare the fused template (e.g., fused template 306) to the at least one database template (e.g., database template 500) to determine whether or not the subject of the plurality of images (e.g., user 46) can be verified to be the subject of the at least one database template (e.g., database template 500). While the above example describes verifying that subject of the plurality of images is an individual (e.g., user 46), template fusion process 10 may compare the fused template to the at least one database template to verify whether the subject (e.g., an object such as a road sign, a vehicle, a tattoo, or any other object) in the plurality of images of the subject is the subject (e.g., an object such as a road sign, a vehicle, a tattoo, or any other object) identified in the at least one database template.

In some implementations, template fusion process 10 may be utilized in a facial recognition system to permit user 46 to access a secure area in user 46's office, or other access control situations. In some implementations, user 46's identity may be verified by enrolling a first plurality of images of user 46's face in to a database. As described above, template fusion process 10 may generate a fused template from the plurality of received images. In some implementations, the first plurality of images of user 46 may be used to generate at least one database template associated with user 46. Subsequently, user 46 may attempt to access the secure area in user 46's office. A camera system (e.g., camera system 46) may capture a second plurality of images of user 46's face. As described above, template fusion process 10 may generate a fused template associated with the second plurality of images. Template fusion process 10 may compare the fused template with the at least one database template to verify that the face captured in the second plurality of images belongs to user 46. While facial recognition has been described, any biometric identifier (e.g., fingerprint, retina of the eye, iris of the eye, footprint, etc.) may be used within the scope of the present disclosure.

Figure 6A:
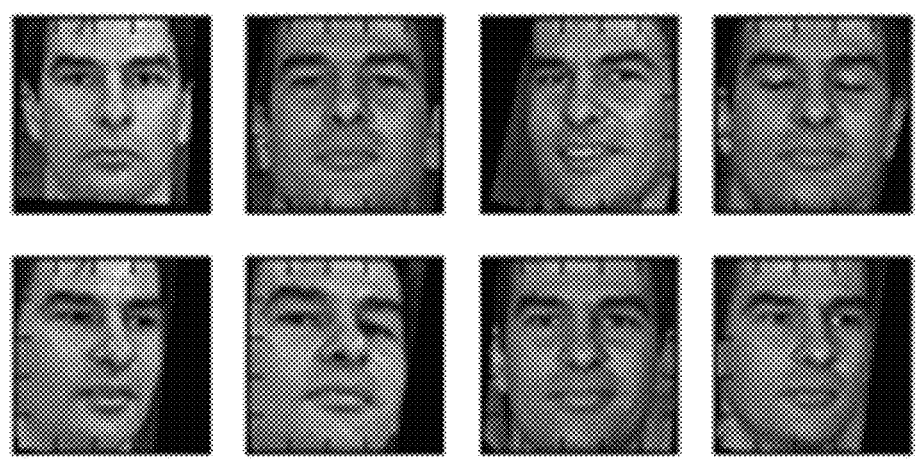
FIGS. 6A and 6B are example images from a face dataset that may be used with template fusion process example implementations of the disclosure.
Figure 6B:
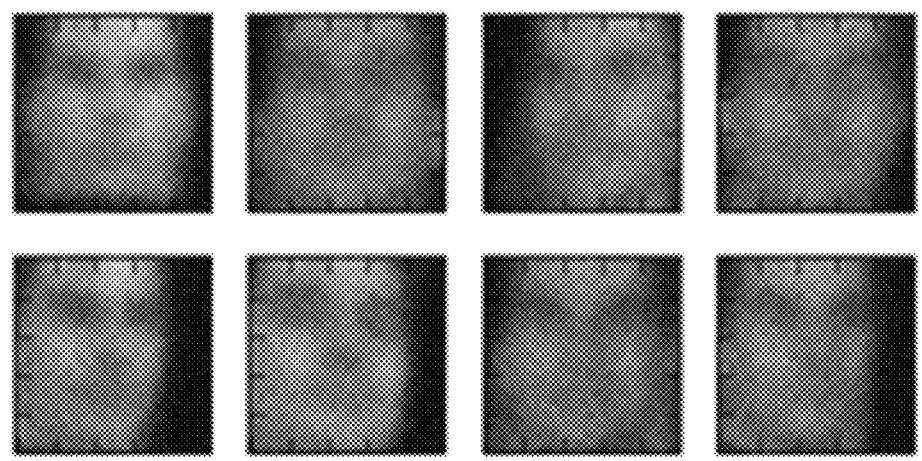

Referring also to FIGS. 6A and 6B, in an illustrative experimental example a face dataset of images of fifty identities (e.g., the Georgia Tech face dataset) was received by template fusion process 10. As shown in FIGS. 6A and 6B, each image of the face dataset was blurred using a standard Gaussian filter (e.g., $\sigma=3$). In this example, a database was generated with two images for each identity. The face dataset included fifty "12-tracks" or one "12-track" per identity. As shown below in Table 1, four tests were performed over a variety of database and fused template subset or sub-track lengths. In Table 1 below, the rows labelled "Baseline" represent a standard search where every image in the track is used to probe or search the database, and the maximum match-score (using cosine similarity) is used to verify/identify. The rows labelled "Template Fusion Process" represent template fusion process 10. The ratio "p/a" represents a test performed with "p" templates (e.g., of the plurality of templates) in the fused template and "a" templates (e.g., of a fused set of database templates) in the database entry.

The column "ROC Area" represents the accuracy of a test as measured by the area under the Receiver Operator Characteristic (ROC) curve from ROC curve analysis. In ROC curve analysis, a true positive rate is plotted against the false positive rate at various threshold settings. An area of "100%" under the curve represents a perfect test. The column "CMC %" represents a cumulative match curve. To generate the cumulative match curve, each probe is compared against all samples (e.g., in a database). The resulting scores are sorted and ranked. The cumulative match curve determines the rank at which a true match occurs. In other words, the "CMC %" may describe the probability of observing the correct identity within a given number of ranks. The column "Improvement (TP classification likelihood)" represents the improvement in the true positive classification likelihood (e.g., likelihood of correctly classifying the subject) associated with template fusion process 10 over the "Baseline" test.

|  | ROC Area (%) | CMC % (Ranks = 1, 2, 3) | Improvement (TP classification likelihood) |
|---|---|---|---|
| Baseline $\frac{5}{5}$ | 88.4 | 66, 72, 82 |  |
| Template Fusion Process $\frac{5}{5}$ | 94.3 | 74, 80, 84 | 2.03× |
| Baseline $\frac{7}{7}$ | 89.2 | 62, 72, 78 |  |
| Template Fusion Process $\frac{7}{7}$ | 97.4 | 84, 88, 92 | 4.153× |
| Baseline $\frac{12}{3}$ | 92.3 | 64, 80, 89 |  |
| Template Fusion Process $\frac{12}{3}$ | 95.3 | 58, 72, 82 | 1.7× |
| Baseline $\frac{10}{5}$ | 89.9 | 66, 72, 79 |  |
| Template Fusion Process $\frac{10}{5}$ | 95.1 | 78, 84, 86 | 2.24× |

As can be seen from Table 1, template fusion process 10 demonstrates an improvement in the true positive classification likelihood when compared to the "Baseline" test.

In some implementations utilizing template fusion process 10, it may be observed that visual identification systems and/or visual verification systems utilizing neural networks may be improved by allowing a neural network trained on high quality data to be more effective in identifying/verifying subjects in lower quality images. For example, and as discussed above, template fusion process 10 may generate a fused template with a standard deviation that differs from the standard deviation of at least one database template (e.g., generated from high quality images/data). By comparing the fused template (e.g., generated from lower quality images/data) to the at least one database template based upon, at least in part, the Bhattacharyya distance between the fused template and the at least one database template, template fusion process 10 may provide improved subject verification and/or identification even when the fused template and the at least one database template have different standard deviations.

Figure 7:
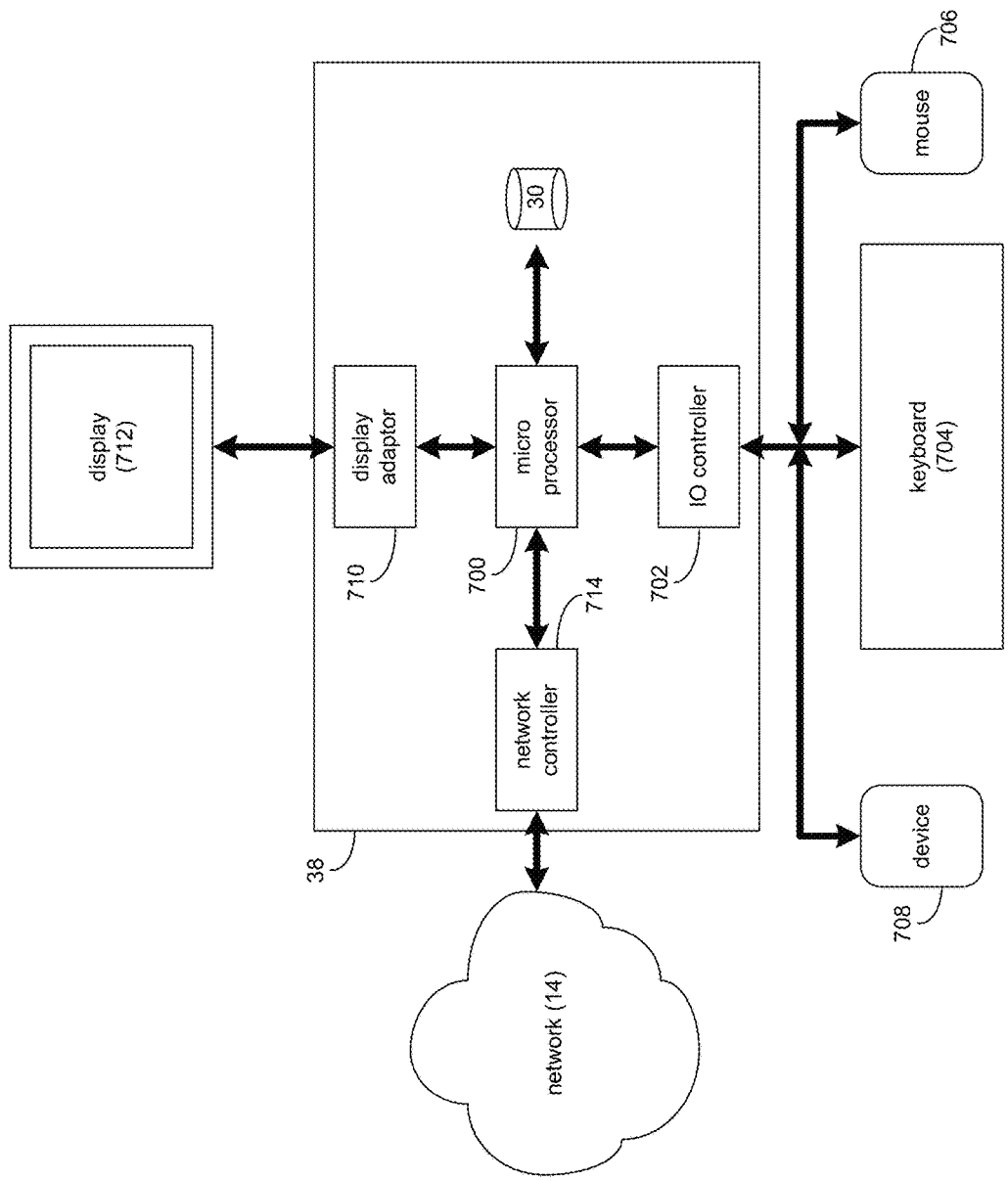
FIG. 7 is an example diagrammatic view of a client electronic device of FIG. 1 according to one or more example implementations of the disclosure.

Referring also to FIG. 7, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, template fusion process 10 may be substituted for client electronic device 38 within FIG. 7, examples of which may include but are not limited to computing device 12 and/or client electronic devices 40, 42, 44.

Client electronic device 38 may include a processor and/or microprocessor (e.g., microprocessor 700) configured to, e.g., process data and execute the above-noted code/instruction sets and subroutines. Microprocessor 700 may be coupled via a storage adaptor (not shown) to the above-noted storage device(s) (e.g., storage device 30). An I/O controller (e.g., I/O controller 702) may be configured to couple microprocessor 200 with various devices, such as keyboard 704, pointing/selecting device (e.g., mouse 706), custom device (e.g., device 708), USB ports (not shown), and printer ports (not shown). A display adaptor (e.g., display adaptor 710) may be configured to couple display 712 (e.g., CRT or LCD monitor(s)) with microprocessor 700, while network controller/adaptor 714 (e.g., an Ethernet adaptor) may be configured to couple microprocessor 700 to the above-noted network 14 (e.g., the Internet or a local area network).

Figure 8:
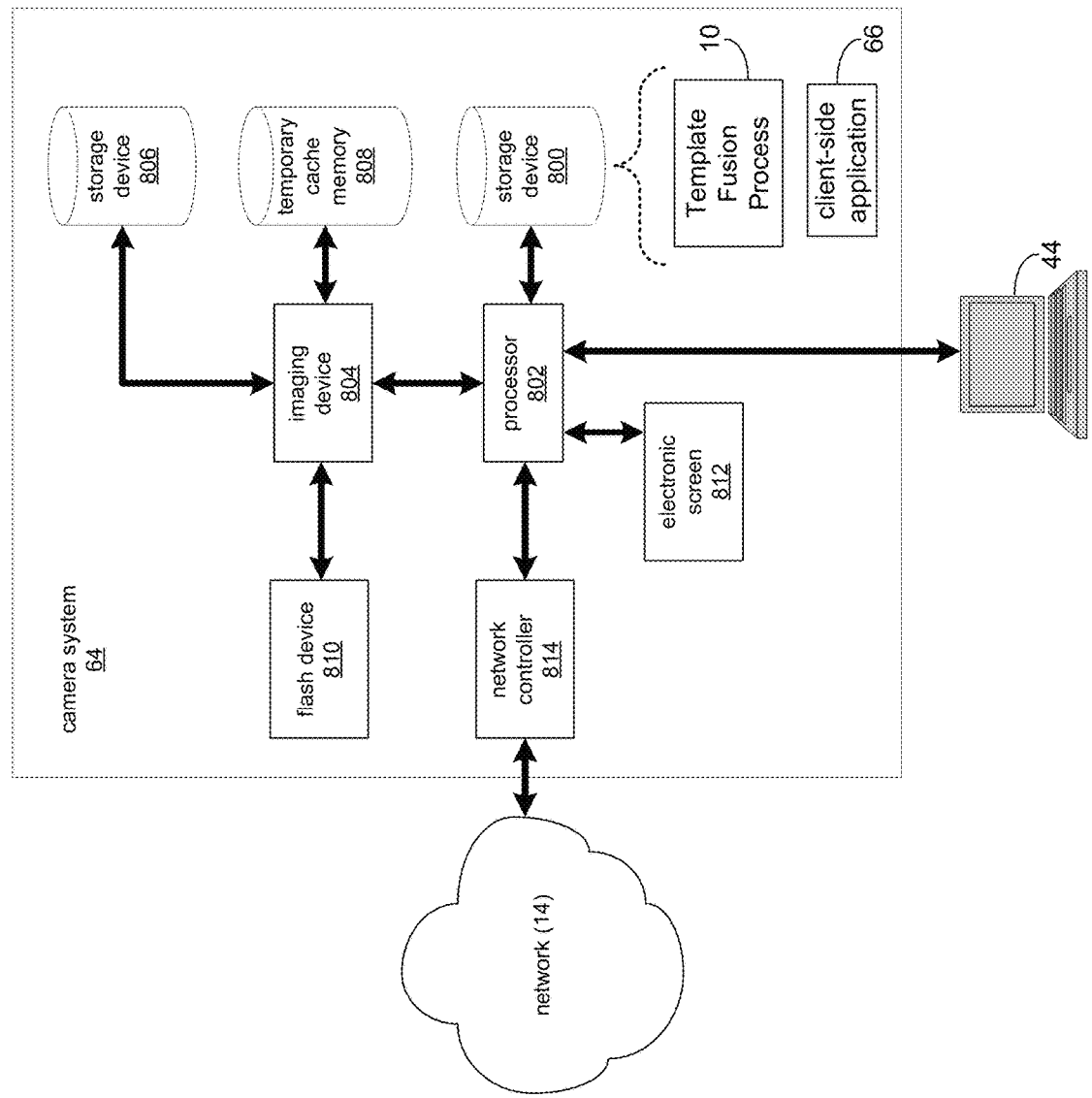
FIG. 8 is an example diagrammatic view of a camera system of FIG. 1 according to one or more example implementations of the disclosure.

Referring also to FIG. 8, there is shown a diagrammatic view of an image or video capturing device (e.g., camera system 64). Camera system 64 may include, for example, a chemical film based camera, a digital camera, a video camera, a web camera, and a camera phone. The instruction sets and subroutines of template fusion process 10, which may be stored on storage device 800 coupled to camera system 64, may be executed by one or more processors, (e.g., processor 802) and one or more memory architectures incorporated into camera system 12. Storage device 800 may include but is not limited to: a hard disk drive; a tape drive; an optical drive; a RAID array; a random access memory (RAM); a read-only memory (ROM); compact flash (CF) storage devices; secure digital (SD) storage devices; and memory stick storage devices.

Camera system 64 may include imaging device 804 configured to take one or more pictures of one or more objects within a viewing field of imaging device 804. As mentioned above, camera system 64 may include, for example, a chemical film based camera, a digital camera, a video camera, a web camera and a camera phone. As such, imaging device 804 may include, but is not limited to, a chemical film based imaging device (e.g., which may be capable of capturing an image on one or more frames of chemical based photographic film, or a photographic plate), and a digital imaging device, such, but not limited to, a charge coupled device (CCD) or a complementary metal-oxide-semiconductor (CMOS) sensor capable of image capture. Imaging device 804, which may include a chemical film based imaging device and/or a digital imaging device may be configured as a video imaging device, e.g., which may be capable of capturing a sequence of still images that may be capable or representing scenes in motion.

Imaging device 804 may include a shutter mechanism and may be coupled to one or more of storage devices 806, 808 configured to store pictures taken by camera system 64. Storage device 804 may include, but is not limited to, a chemical film based storage device (e.g., including one or more frames of chemical based photographic film and/or a photographic plate), and an electronic storage device (e.g., a hard disk drive, a tape drive, an optical drive, a RAID array, a random access memory, a read only memory, compact flash (CF) storage devices, secure digital (SD) storage devices, and memory stick storage devices). Camera system 64 may include one or more lenses, an auto-focusing mechanism, and a range-finding mechanism, which may be coupled to imaging device 804. Imaging device 804 may be coupled to processor 802, and may be configured to send one or more signals to imaging device 804 for triggering imaging device 804 to take one or more pictures.

Imaging device 804 may include a flash device 810. Upon determining that a detected light level (e.g., as detected with a photocell) is below a predefined threshold light level, imaging device 804 may provide flash illumination by triggering flash device 810. When triggered, flash device 810 may provide the necessary illumination to achieve a light level equal to, or above, the predefined threshold light level. Once properly illuminated, imaging device 804 may take one or more pictures of an object illuminated by flash device 810.

Camera system 64 may include electronic screen 812. Electronic screen 812 may be a display screen used as a view finder or for displaying the viewing field of the camera. Camera system 64 may generate a live preview of the viewing field of camera system 64 by means of continuously and directly projecting the image formed by the lens of camera system 64 onto a main image sensor that feeds electronic screen 812 with the live preview image of the viewing field of the camera. Electronic screen 812 may be a liquid crystal display (LCD) or an electronic viewfinder. Additionally, network controller/adaptor 814 (e.g., an Ethernet adaptor) may be configured to couple processor 802 to the above-noted network 14 (e.g., the Internet or a local area network). In some implementations, processor 802 may include one or more IO ports to directly connect (e.g., via a cable) to a computing device (e.g., client device 44). Once connected to a computing device, template fusion process 10 may import or otherwise receive the plurality of images from camera system 64.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, executed on a computing device, comprising:
   receiving, at the computing device, a plurality of images of a subject;
   processing the plurality of images of the subject to generate one or more templates, wherein the one or more templates each include one or more elements; and
   generating a fused template from the one or more templates, based upon, at least in part, a stopping criterion, wherein generating the fused template includes generating a probability density function, based upon, at least in part, a subset of the one or more templates, wherein the subset of the one or more templates includes at least one of a probability density and the probability density function for each respective dimension of the one or more elements.

2. The computer-implemented method of claim 1, wherein generating the probability density function includes: initializing the subset of the one or more templates with at least one template from the one or more templates; constructing a sample matrix of the subset of the one or more templates; and generating at least one mean vector and at least one variance vector from the sample matrix.

3. The computer-implemented method of claim 2, wherein generating the probability density function includes:
   determining an average standard error of the mean for the probability density function; and
   adding at least one additional template to the subset of the one or more templates based upon, at least in part, the stopping criterion and the average standard error of the mean of the probability density function.

4. The computer-implemented method of claim 1, further comprising:
   comparing the fused template to at least one database template based upon, at least in part, a Bhattacharyya distance between the fused template and the at least one database template.

5. The computer-implemented method of claim 4, wherein comparing the fused template includes comparing the fused template to the at least one database template to identify the subject in the plurality of images of the subject from a plurality of subjects identified in the at least one database template.

6. The computer-implemented method of claim 4, wherein comparing the fused template includes comparing the fused template to the at least one database template to verify whether the subject in the plurality of images of the subject is the subject identified in the at least one database template.

7. A computer program product residing on a non-transitory computer readable medium having a plurality of instructions stored thereon which, when executed across one or more processors, causes at least a portion of the one or more processors to perform operations comprising:

receiving a plurality of images of a subject;

processing the plurality of images of the subject to generate one or more templates, wherein the one or more templates each include one or more elements; and generating a fused template from the one or more templates, based upon, at least in part, a stopping criterion, wherein generating the fused template includes generating a probability density function, based upon, at least in part, a subset of the one or more templates, wherein the subset of the one or more templates includes at least one of a probability density and the probability density function for each respective dimension of the one or more elements.

8. The computer program product of claim 7, wherein generating the probability density function includes: initializing the subset of the one or more templates with at least one template from the one or more templates; constructing a sample matrix of the subset of the one or more templates; and generating at least one mean vector and at least one variance vector from the sample matrix.

9. The computer program product of claim 8, wherein generating the probability density function includes:

determining an average standard error of the mean for the probability density function; and adding at least one additional template to the subset of the one or more templates based upon, at least in part, the stopping criterion and the average standard error of the mean of the probability density function.

10. The computer program product of claim 7, further comprising instructions for:

comparing the fused template to at least one database template based upon, at least in part, a Bhattacharyya distance between the fused template and the at least one database template.

11. The computer program product of claim 10, wherein comparing the fused template includes comparing the fused template to the at least one database template to identify the subject in the plurality of images of the subject from a plurality of subjects identified in the at least one database template.

12. The computer program product of claim 10, wherein comparing the fused template includes comparing the fused template to the at least one database template to verify whether the subject in the plurality of images of the subject is the subject identified in the at least one database template.

13. A computing system comprising one or more processors and one or more memories, wherein the computing system is configured to perform operations comprising:

receiving a plurality of images of a subject;

processing the plurality of images of the subject to generate one or more templates, wherein the one or more templates each include one or more elements; and generating a fused template from the one or more templates, based upon, at least in part, a stopping criterion, wherein generating the fused template includes generating a probability density function, based upon, at least in part, a subset of the one or more templates, wherein the subset of the one or more templates includes at least one of a probability density and the probability density function for each respective dimension of the one or more elements.

14. The computing system of claim 13, wherein generating the probability density function includes: initializing the subset of the one or more templates with at least one template from the one or more templates; constructing a sample matrix of the subset of the one or more templates; and generating at least one mean vector and at least one variance vector from the sample matrix.

15. The computing system of claim 14, wherein generating the probability density function includes:

determining an average standard error of the mean for the probability density function; and adding at least one additional template to the subset of the one or more templates based upon, at least in part, the stopping criterion and the average standard error of the mean of the probability density function.

16. The computing system of claim 13, wherein the operations further comprise:

comparing the fused template to at least one database template based upon, at least in part, a Bhattacharyya distance between the fused template and the at least one database template.

17. The computing system of claim 16, wherein comparing the fused template includes comparing the fused template to the at least one database template to identify the subject in the plurality of images of the subject from a plurality of subjects identified in the at least one database template.

* * * * *